(12) United States Patent
Weichbold et al.

(10) Patent No.: US 8,154,143 B2
(45) Date of Patent: Apr. 10, 2012

(54) WIND ENERGY CONVERTER COMPRISING A SUPERPOSITION GEAR

(75) Inventors: Peter Weichbold, Klagenfurt (AT); Robert Tratnig, St. Margareten (AT)

(73) Assignee: AMSC Austria GmbH, Klagenfurt Am Worthersee (AT)

( * ) Notice: Subject to any disclaimer, the term of this patent is extended or adjusted under 35 U.S.C. 154(b) by 0 days.

(21) Appl. No.: 12/528,138

(22) PCT Filed: Jan. 29, 2009

(86) PCT No.: PCT/EP2009/050968
§ 371 (c)(1),
(2), (4) Date: Oct. 15, 2009

(87) PCT Pub. No.: WO2009/121639
PCT Pub. Date: Oct. 8, 2009

(65) Prior Publication Data
US 2010/0102558 A1  Apr. 29, 2010

(30) Foreign Application Priority Data
Mar. 31, 2008  (EP) .................................... 08450046

(51) Int. Cl.
*F03D 9/00* (2006.01)
*H02P 9/04* (2006.01)
(52) U.S. Cl. .......................................... 290/44; 290/55
(58) Field of Classification Search .................. 290/44, 290/55
See application file for complete search history.

(56) References Cited

U.S. PATENT DOCUMENTS

| | | | | |
|---|---|---|---|---|
| 4,474,104 A | * | 10/1984 | Creffield | 91/497 |
| 4,503,673 A | * | 3/1985 | Schachle et al. | 60/398 |
| 4,586,400 A | | 5/1986 | Nygren | 5/2 |
| 4,792,700 A | * | 12/1988 | Ammons | 290/55 |
| 4,936,155 A | * | 6/1990 | Gogins | 74/117 |
| 5,140,170 A | * | 8/1992 | Henderson | 290/44 |
| 6,176,804 B1 | * | 1/2001 | Kekki et al. | 475/331 |
| 6,247,295 B1 | * | 6/2001 | Hansen et al. | 56/10.2 A |
| 6,420,808 B1 | * | 7/2002 | Hosle | 310/83 |
| 6,537,032 B1 | * | 3/2003 | Horiuchi et al. | 417/18 |
| 6,647,326 B2 | * | 11/2003 | Nakamori et al. | 701/22 |
| 6,658,341 B2 | * | 12/2003 | Inoue et al. | 701/67 |
| 6,931,315 B2 | * | 8/2005 | Ayabe et al. | 701/59 |
| 7,008,348 B2 | * | 3/2006 | LaBath | 475/338 |
| 7,090,614 B2 | * | 8/2006 | Takagi | 477/61 |
| 7,115,066 B1 | * | 10/2006 | Lee | 477/15 |
| 7,204,786 B2 | * | 4/2007 | Takagi | 477/94 |
| 7,392,714 B2 | * | 7/2008 | Maguire et al. | 73/862.37 |
| 7,469,758 B2 | * | 12/2008 | Iwanaka et al. | 180/65.1 |
| 7,493,980 B2 | * | 2/2009 | Hidaka | 180/65.25 |
| 7,595,566 B2 | | 9/2009 | Nitzpon et al. | 290/55 |

(Continued)

FOREIGN PATENT DOCUMENTS

DE  102004028619  1/2006

(Continued)

*Primary Examiner* — Pedro J Cuevas
(74) *Attorney, Agent, or Firm* — Occhiuti Rohlicek & Tsao LLP

(57) ABSTRACT

A wind energy converter configured for transmitting power to an electric grid includes a variable ratio gear system mechanically coupled between a rotor and a generator. A control system is configured to mechanically control a rotational speed of the generator so that, during a low voltage event, the wind energy converter can continue to operate and supply power to the grid.

7 Claims, 5 Drawing Sheets

U.S. PATENT DOCUMENTS

| | | | | |
|---|---|---|---|---|
| 7,621,843 | B2 * | 11/2009 | Madge et al. | 475/346 |
| 7,762,365 | B2 * | 7/2010 | Iwanaka et al. | 180/65.22 |
| 7,993,240 | B2 * | 8/2011 | Weichbold et al. | 477/73 |
| 8,046,145 | B2 * | 10/2011 | Ishida et al. | 701/70 |
| 2003/0008745 | A1 * | 1/2003 | Heindl | 475/83 |
| 2003/0109970 | A1 * | 6/2003 | Nakamori et al. | 701/22 |
| 2003/0216218 | A1 * | 11/2003 | Takagi et al. | 477/70 |
| 2004/0145188 | A1 | 7/2004 | Janssen et al. | 290/44 |
| 2004/0162181 | A1 * | 8/2004 | LaBath | 475/338 |
| 2005/0187070 | A1 * | 8/2005 | Takagi | 477/143 |
| 2005/0194787 | A1 * | 9/2005 | Tilscher et al. | 290/8 |
| 2005/0284225 | A1 * | 12/2005 | Luo | 73/593 |
| 2006/0205553 | A1 * | 9/2006 | Lee | 475/5 |
| 2006/0243501 | A1 * | 11/2006 | Hidaka | 180/65.1 |
| 2007/0007769 | A1 | 1/2007 | Basteck | 290/1 C |
| 2007/0107961 | A1 * | 5/2007 | Iwanaka et al. | 180/65.6 |
| 2007/0114081 | A1 * | 5/2007 | Iwanaka et al. | 180/65.3 |
| 2007/0125184 | A1 * | 6/2007 | Maguire et al. | 73/862.37 |
| 2008/0054642 | A1 | 3/2008 | Nitzpon et al. | 290/44 |
| 2008/0066569 | A1 | 3/2008 | Henenberger | 4/434 |
| 2008/0197636 | A1 | 8/2008 | Tilscher et al. | 290/54 |
| 2008/0274849 | A1 * | 11/2008 | Smook et al. | 475/11 |
| 2009/0081042 | A1 * | 3/2009 | Johansen | 416/44 |
| 2009/0140522 | A1 * | 6/2009 | Chapple et al. | 290/43 |
| 2009/0203495 | A1 * | 8/2009 | Muta et al. | 477/3 |
| 2009/0221397 | A1 * | 9/2009 | Demtroder | 475/332 |
| 2010/0031650 | A1 * | 2/2010 | Morinaga et al. | 60/459 |
| 2010/0137092 | A1 * | 6/2010 | Weichbold et al. | 475/31 |
| 2010/0264885 | A1 * | 10/2010 | Olsen et al. | 322/40 |
| 2011/0269583 | A1 * | 11/2011 | Kawakami et al. | 474/28 |
| 2011/0270483 | A1 * | 11/2011 | Endo et al. | 701/29 |
| 2011/0290353 | A1 * | 12/2011 | Fukui et al. | 137/565.11 |
| 2011/0301793 | A1 * | 12/2011 | Hsieh et al. | 701/22 |
| 2011/0318180 | A1 * | 12/2011 | Fischer et al. | 416/41 |

FOREIGN PATENT DOCUMENTS

| | | | |
|---|---|---|---|
| DE | 102005054539 | * | 6/2007 |
| DE | 102005054539 B3 | | 6/2007 |
| EP | 1895158 | | 3/2008 |
| EP | 1631758 | | 5/2008 |
| EP | 2107237 A1 | * | 10/2009 |
| EP | 2107238 A1 | * | 10/2009 |
| GB | 2136883 | | 9/1984 |
| WO | WO 81/01444 A | | 5/1981 |
| WO | WO 8101444 A1 | * | 5/1981 |
| WO | WO 2004/088132 A | | 10/2004 |
| WO | WO 2004088132 A1 | * | 10/2004 |
| WO | WO 2004109157 A1 | * | 12/2004 |
| WO | WO 2008/149109 | | 12/2008 |
| WO | WO 2010105692 A1 | * | 9/2010 |

\* cited by examiner

WIND ENERGY CONVERTER COMPRISING A SUPERPOSITION GEAR

CROSS-REFERENCE TO RELATED APPLICATIONS

This application is the National Stage of International Application No. PCT/EP2009/050968, filed on Jan. 29, 2009, which claims the priority of European Patent Application No. 08450046.1, filed on Mar. 31, 2008. The contents of both applications are hereby incorporated by reference in their entirety.

BACKGROUND

The invention relates to wind energy converters (WECs).

Wind energy has emerged as the fastest growing source of energy, presenting a clean, renewable, and ecological-friendly alternative to traditional fossil-based energy supplies. At the current growth rate, wind energy conversion is projected to produce more than 117,000 MW by the year of 2009, claiming about 1.25% of the world's electricity generation. Currently, wind power is most often utilized in large-scale wind farms for providing electricity to power grids, though sometimes also in individual wind turbines to service rural residences at grid-isolated locations. As the total base of wind capacity continues to grow with the installation of additional wind turbines and new wind farms, compliance with power grid interconnection standards becomes increasingly important.

One interconnection standard, in particular, requires electrical generators (e.g., hydroelectric, thermoelectric, and nuclear generators) to continue to operate during disturbances and remain connected to the grid during voltage drops, a process called "low-voltage ride through" (LVRT). For instance, when the voltage at the terminal of the generator falls under a prescribed level (e.g., due to a short circuit in the grid), power stations with LVRT capability continue to provide electricity to the power grid rather than being switched offline, thereby effectively stabilizing the grid.

However, in certain situations, prior art WECs have been allowed to trip offline during a low voltage event, primarily because wind power contributions were considered insignificant to the entire power capacity in the grid. Once disconnected from the power grid, WECs usually go through a restart cycle without providing power to the grid for several minutes.

Recently, in consideration of the growing trend of wind plant/farm integration to the power grid and its potential influence on grid stability, the Federal Energy Regulatory Commission (FERC) has proposed a LVRT standard on WECs, which requires large wind plants or farms (with a capacity of 20 MW or greater) to stay online and to operate continuously during low-voltage occurrences.

SUMMARY

In one general aspect of the invention, a wind energy converter is configured for transmitting power to an electric grid. The wind energy converter includes a variable ratio gear system mechanically coupled between a rotor and a generator. A control system is configured to mechanically control a rotational speed of the generator so that, during a low voltage event, the wind energy converter can continue to operate and supply power to the grid.

Embodiments may include one or more of the following features.

The variable ratio gear system includes at least one shaft coupled to the generator, and the control system controls the shaft to control the rotational speed of the generator. The variable ratio gear system further includes a hydraulic circuit mechanically coupled to the shaft. The hydraulic circuit provides a hydraulic pressure. The control system is configured to control the shaft on the basis of the hydraulic pressure. The hydraulic circuit includes a hydraulic unit mechanically coupled to the generator. The control system determines a desired configuration of the hydraulic unit associated with a prescribed generator speed.

The control system includes a pressure controller configured to provide a desired hydraulic pressure signal indicative of a desired hydraulic pressure associated with the prescribed generator speed. The control system receives an actual hydraulic pressure signal indicative of an actual hydraulic pressure, and computes a pressure error signal between the desired and actual hydraulic pressure signals. The control system further computes, on the basis of the pressure error signal, a first parameter of the desired configuration of the hydraulic unit. The control system receives an offset signal and computes a second parameter of the desired configuration of the hydraulic unit on the basis of the offset signal and the first parameter. The control system determines the desired configuration of the hydraulic unit on the basis of the first and second parameters. The first and second parameters are responsive to a change in the rotational speed of the generator. The second parameter conforms to a predetermined limitation. The predetermined limitation includes a limitation on a rate of change in the second parameter.

The hydraulic circuit further includes a second hydraulic unit, and the control system determines a desired configuration of the second hydraulic unit on the basis of a rotor speed. The hydraulic circuit may be a hydrostatic circuit, or alternatively, a hydrodynamic circuit.

The variable ratio gear system includes a first shaft mechanically coupled to the rotor, a second shaft mechanically coupled to a hydraulic circuit, and a third shaft mechanically coupled to the hydraulic circuit and the generator.

The variable ratio gear system further includes a gear box mechanically coupled between the first shaft and the rotor. The gear box is configured to give a constant gear ratio. A first spur gear is mechanically coupled between the gear box and the first shaft. A second spur gear is mechanically coupled between the hydraulic circuit and the second shaft. A third spur gear mechanically coupled between the hydraulic circuit and the third shaft.

Among other advantages, a control system for WECs that meets the LVRT standard is provided. During a low voltage event, the control system effectively regulates generator speed and maintains the phase difference between rotor field and stator field in the generator below a critical angle, so that electric power continues to be safely transmitted. During normal operation of wind energy converters, the control system is also useful in regulating the output of variable ratio gear system to avoid undesirable acceleration of the generator.

Other features and advantages of the invention are apparent from the following description, and from the claims.

DETAILED DESCRIPTION

Figure 1A:
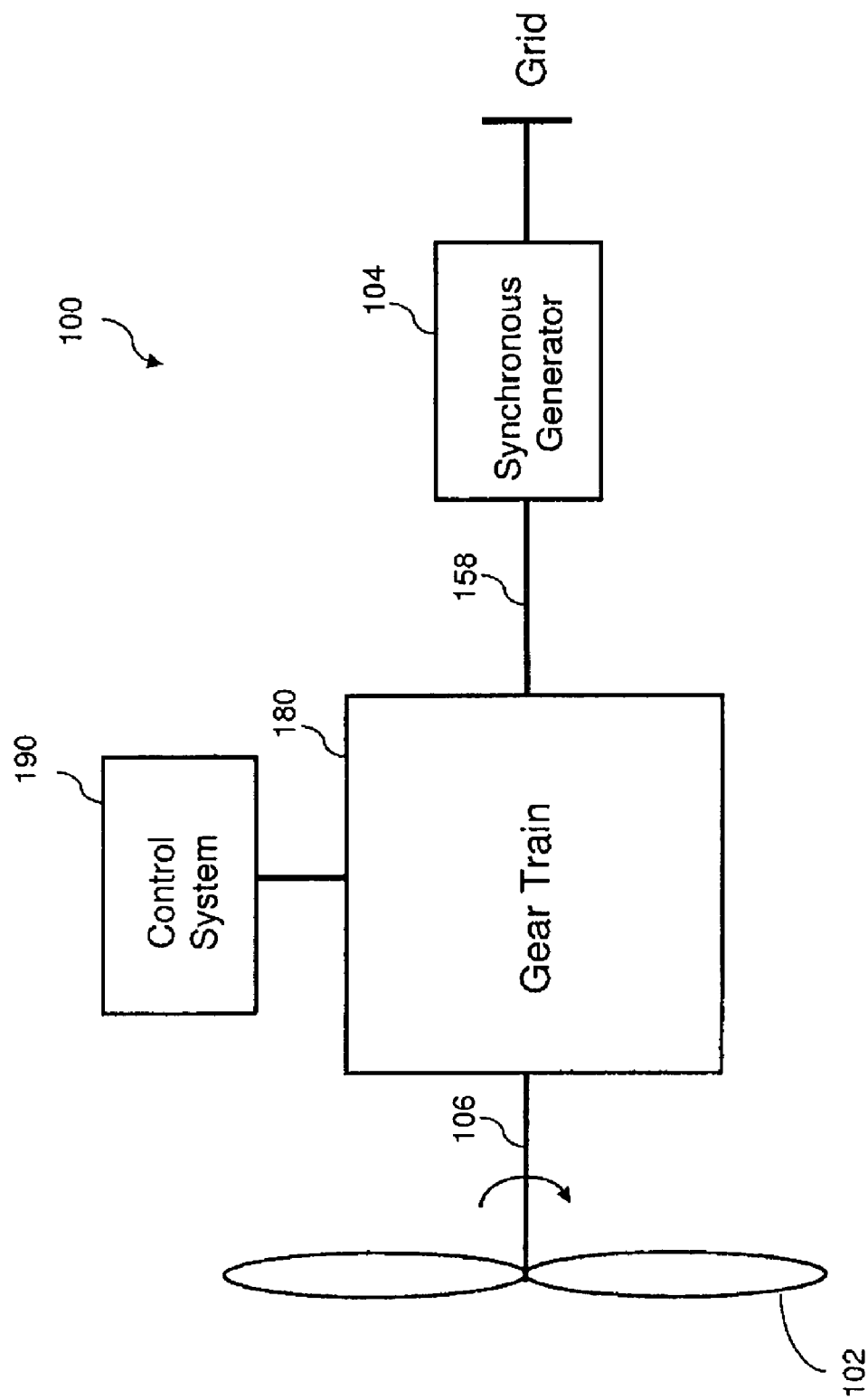
FIGS. 1A and 1B are schematic illustrations of a wind energy converter equipped with a control system.

Referring to FIG. 1A, a drive train 100 for a wind energy converter includes a rotor 102 (e.g., a low speed propeller) that drives a generator 104 (preferably, a constant speed synchronous generator) through a gear train 180. The speed of the rotor 102 is generally influenced by local wind conditions and therefore fluctuates arbitrarily. The gear train 180 receives this varying rotor speed through an input shaft 106. A control system 190 adopts active toque control strategy that controls the gear train 180 to drive an output shaft 158 and the synchronous generator 104 at a constant rotational speed. The synchronous generator 104 provides high-quality electric power that can be directly transmitted to the grid without a converter.

In addition to providing active torque control, the control system 190 is also configured to provide low-voltage ride through (LVRT) capability by detecting the occurrence of grid failure and keeping the wind energy converter safely online during low voltage events. In describing this LVRT capability, the internal structure and the mechanics of the gear train 180 are discussed briefly below.

Generally, there are many embodiments of gear configuration in the gear train 180. For the purpose of illustration, one embodiment is presented.

Figure 1B:
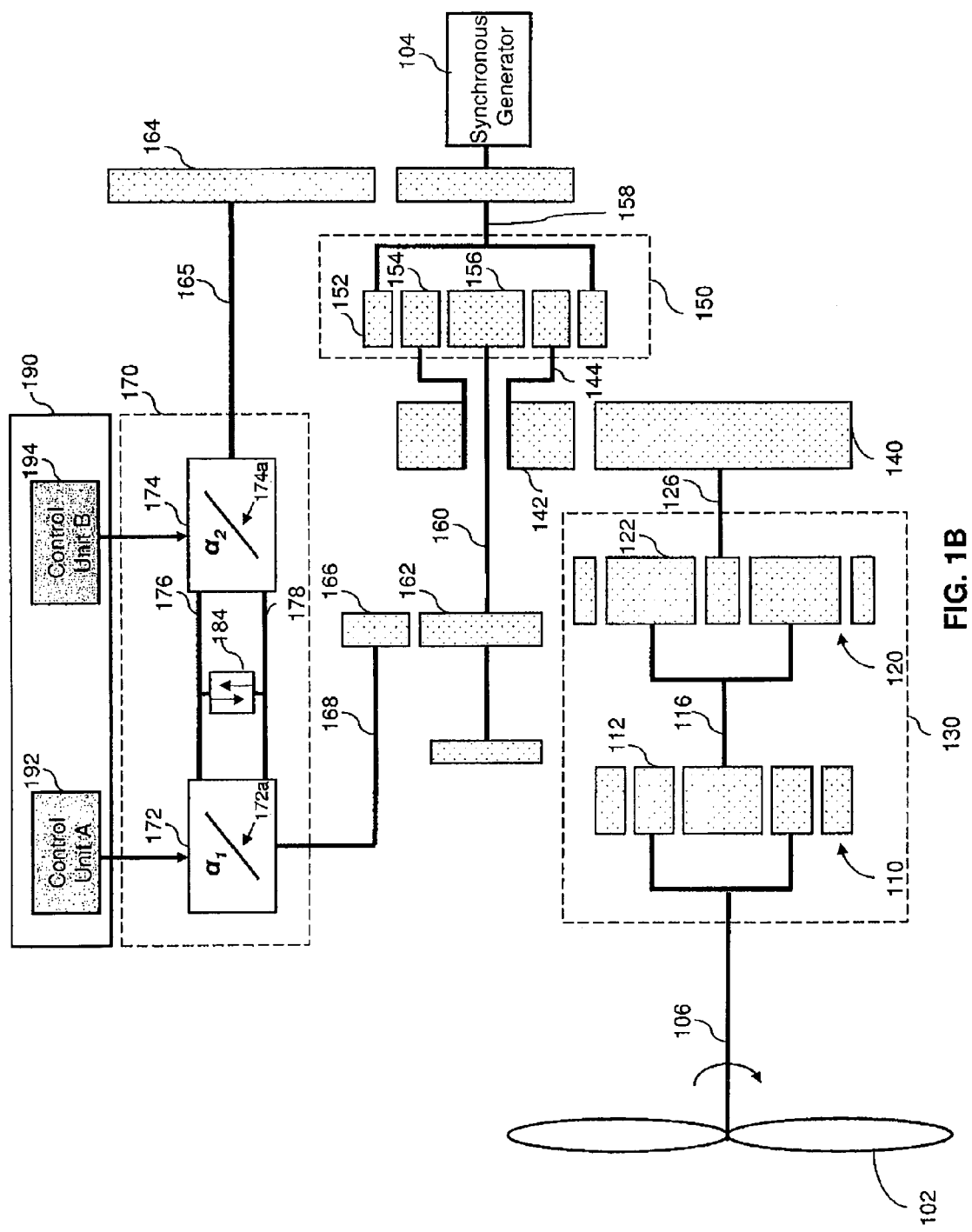

Referring to FIG. 1B, in a preferred embodiment, the rotor 102 is first connected through shaft 106 to a constant-ratio gear box 130. The gear box 130 is configured to transfer power from the low speed (high torque) input shaft 106 to a high speed (low torque) output shaft 126. In some examples, the gear box 130 includes a first and second epicyclic gears 110 and 120. Power at the input shaft 106 is transmitted, e.g., first to the planet carrier 112 of the first epicyclic gear 110, and then via a shaft 116 to the planet carrier 122 of the second epicyclic gear 120. Both epicyclic gears 110 and 120 are configured to give constant step-up ratios so that the speed of rotation gradually increases from, e.g., 15 RPM at the input shaft 106, to, e.g. 375 RPM at the low-torque output shaft 126 of the gear box 130. In some other examples, the gear box 130 may include additional or fewer gears configured in a different way to transmit power from low speed shaft 106 to high speed shaft 126.

The low-torque output shaft 126 drives a spur gear 140, which meshes with a pinion 142, and transmits power via a shaft 144 to a third epicyclic gear 150. The epicyclic gear 150 has three basic components, a planet carrier 154, an annulus 152, and a sun wheel 156. As described above, the planet carrier 154 receives input from shaft 144 and thus rotates at a speed proportional to the varying rotor speed. The annulus 152 is coupled to the generator 104 via a shaft 158, and rotates at the same speed as the generator 104. In this configuration, a constant generator speed is maintained by controlling the rotation of the sun wheel 156.

The sun wheel 156 is connected to an infinitely variable gear system 170 via a spur gear 162 and a pinion 166. In some examples, the infinitely variable gear 170 system includes a first and second hydraulic units 172 and 174 (e.g., hydraulic pumps/motors), interconnected by pressure lines 176 and 178.

The first hydraulic unit 172 controls the speed and direction of the rotation of sun wheel 156 via a shaft 168, pinion 166, spur gear 162, and shaft 160. Note that shaft 160 has no fixed transmission ratio either to the rotor 102 or to the generator 104, thereby acting as a variable speed control shaft. The second hydraulic unit 174 is coupled to the generator 104 via a shaft 165 and spur gear 164, and operates at a rotational speed proportional to the speed of the generator 104.

Preferably, both hydraulic units 172 and 174 have swash plates (symbolized in the figure as 172a, 174a) with controllable swivel angles (referred to herein as $\alpha_1$ and $\alpha_2$, respectively). The setting of swivel angles in the hydraulic units governs the direction and amount of power flow provided by the infinitely variable gear system 170 to the variable control speed shaft 160.

The control system 190 controls the swivel angles so that, during normal operation, a steady flow of power is transmitted to the generator and the grid. In case of a grid failure or sudden voltage drop, the control system 190 provides LVRT capability that keeps the generator safely online while continuing transmitting power to the grid.

The control system 190 includes a control unit A 192 and a control unit B 194, configured to control swivel angles $\alpha_1$ and $\alpha_2$, respectively. The operation of each control unit is illustrated further below.

Control unit A 192, for example, adjusts the swivel angle $\alpha_1$ in the first hydraulic unit 172 according to instant rotor speed. In some examples, the control unit A 192 may use a pre-determined lookup table to select the value of $\alpha_1$ at a given rotor speed. The pre-determined lookup table includes desirable values of $\alpha_1$ as a function of rotor speed $\omega_{rotor}$, and is established e.g., by engineers during a testing phase.

Control unit B 194 adjusts the swivel angle $\alpha_2$ in the second hydraulic unit 174 using an active torque control strategy. One implementation of control unit B 194 is shown in part in FIG. 2A.

Figure 2A:
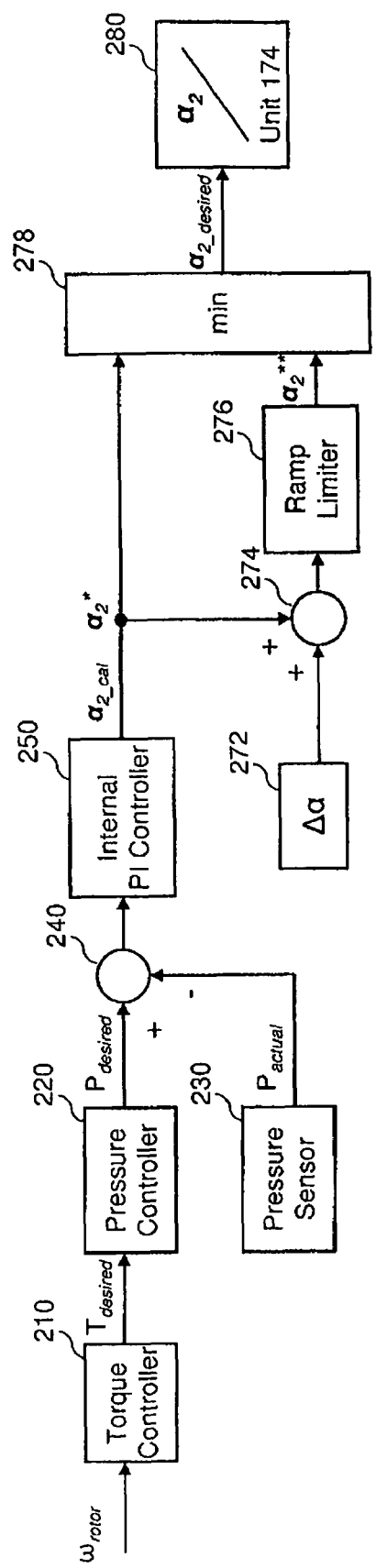
FIG. 2A is a block diagram of an exemplary implementation of the control system shown in FIG. 1B.

Referring to FIG. 2A, a torque controller 210 receives an input of a rotor speed $\omega_{rotor}$, and determines the amount of torque $T_{desired}$ that is desired on shafts 168 and 165, respectively, for driving the generator at a prescribed speed $\omega_{generator}$.

Based on $T_{desired}$, a pressure controller 220 determines a desired pressure $P_{desired}$ in the hydraulic circuit to maintain the rotation of the generator 104 at the constant speed $\omega_{generator}$. In this description, $P_{desired}$ generally refers to the desired pressure difference between pressure lines 176 and 178. This pressure difference is a primary driving force of the hydraulic flow in lines 176 and 178, affecting both the direction and volume rate of the flow.

$P_{desired}$ is compared with the actual pressure difference $P_{actual}$ between the hydraulic lines. $P_{actual}$ can be measured e.g., by one or multiple pressure sensors placed in the infinitely variable gear system 170. The error between $P_{actual}$ and $P_{desired}$, calculated by a summer 240, is minimized by an internal proportional integral (PI) controller 250.

The internal PI controller 250 provides an output signal $\alpha_{2\_cal}$, which is also referred to as a first desired angle $\alpha_2^*$. This first desired angle $\alpha_2^*$ is provided as a first input to a minimizer 278. $\alpha_2^*$ is also summed with a small offset 272, referred to as $\Delta\alpha$, by a summer 274. In some examples, $\Delta\alpha$ is predetermined to be a small percentage (e.g. 5%) of $\alpha_2^*$. The output of the summer 274 is received by and processed in a ramp limiter 276 to obtain a second desired angle $\alpha_2^{**}$, which is further provided to the minimizer 278 as a second input. From these two inputs $\alpha_2^*$ and $\alpha_2^{**}$, the minimizer 278 selects the smaller angle as an ultimate desired angle $\alpha_{2\_desired}$ to be set in the hydraulic unit 174.

During normal operation, although rotor speed may fluctuate due to local wind conditions, such fluctuation does not usually cause a high rate of change in the first desired angle $\alpha_2^*$. Accordingly, the input of the ramp limiter 276, $\Delta\alpha+\alpha_2^*$, does not have a high rate of change. In these situations, the ramp limiter 276 directly outputs $\Delta\alpha+\alpha_2^*$, and the minimizer 278 selects $\alpha_2^*$ as the ultimate desired angle $\alpha_{2\_desired}$ to be set in the hydraulic unit 174.

However, there are situations that may cause the first desired angle $\alpha_2^*$ to change rapidly. For example, a sudden drop in grid voltage reduces the effective drag on the generator, resulting in a positive net torque that accelerates the generator, which in turn causes a rapid change in the first desired angle $\alpha_2^*$. If this fast-changing $\alpha_2^*$ signal were directly fed to hydraulic unit 174, the swash plate could be positioned at undesirable angles causing damage to the hydraulics.

In the current system, when sudden voltage drop/grid failure occurs, the ramp-limiter 276 acts to limit the rate of change in its output signal $\alpha_2^{**}$. When the fast-changing first angle $\alpha_2^*$ exceeds second angle $\alpha_2^{}$, the minimizer 278 switches to adopting $\alpha_2^{}$ as the ultimate desired angle in hydraulic unit 174. As a result, the generator can continue supplying power to the grid during low voltage events without causing extreme swash plate positions in the hydraulics.

While the flow diagram shown in FIG. 2A illustrates one example of a control system providing LVRT capability, there are many alternative configurations of control system 190 suitable for this application. For example, upon detecting a sudden voltage drop, a control system may immediately lock the swash plate in one or both hydraulic units to a fixed position to avoid potential damage.

There are other scenarios during normal operation of wind energy converters in which the generator may be caused to undesirably accelerate. In these other scenarios, the control system may be useful.

Figure 2B:
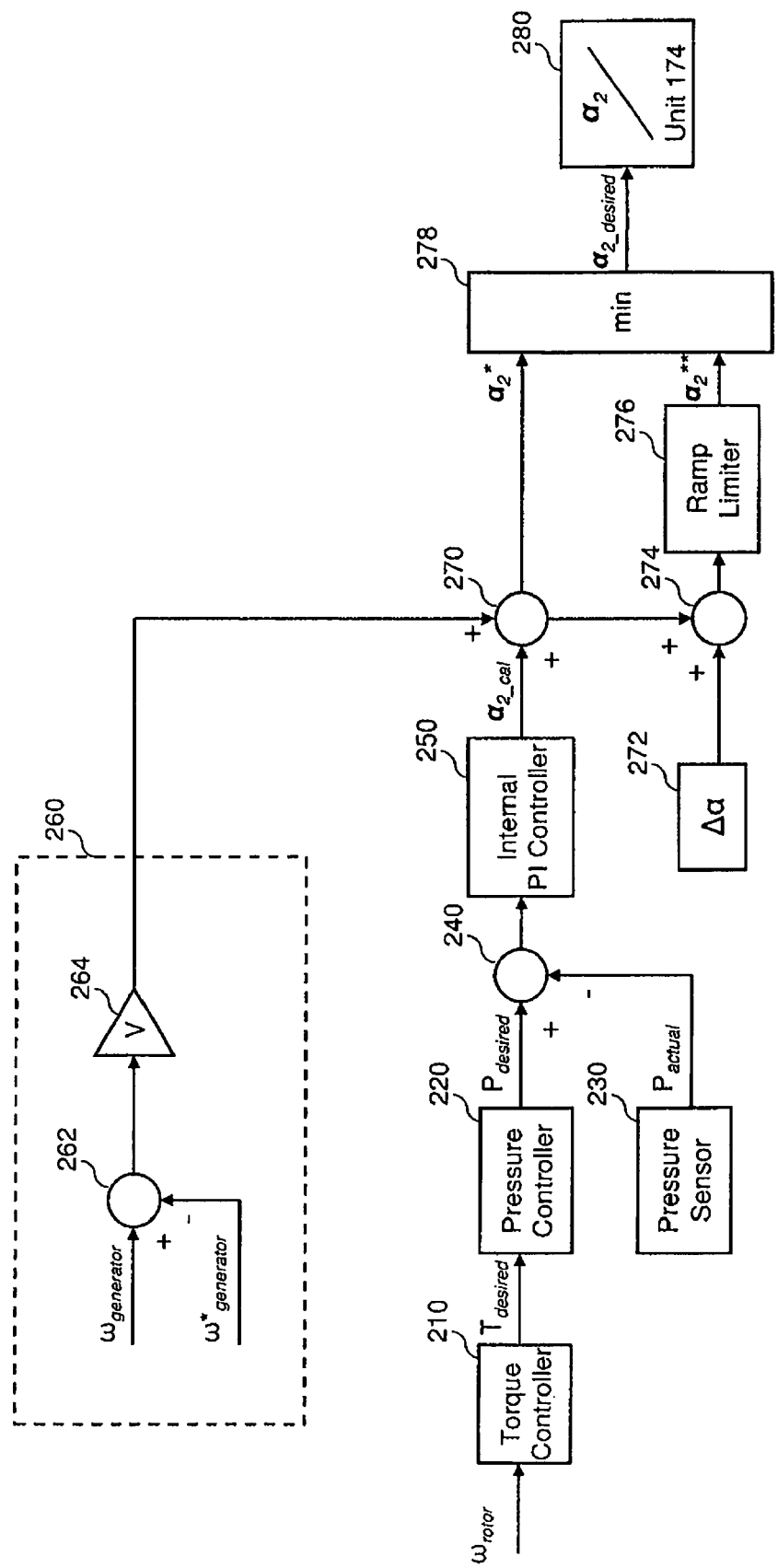
FIG. 2B is a block diagram of an alternative implementation of the control system shown in FIG. 1B.

For example, referring to FIG. 2B, an optional control block 260 provides signal 266 as a second input to the summer 270. The control block 260 calculates an error between the actual generator speed $\omega^*_{generator}$ and prescribed generator speed $\omega_{generator}$, and uses a proportional gain unit 264 to feed the error signal to the summer 270. This error signal is further incorporated in the computation of the first and second desired angles $\alpha_2^*$ and $\alpha^{**}$ for setting a proper swivel angle in hydraulic unit 172 that avoids overspeed of the generator.

Figure 3B:
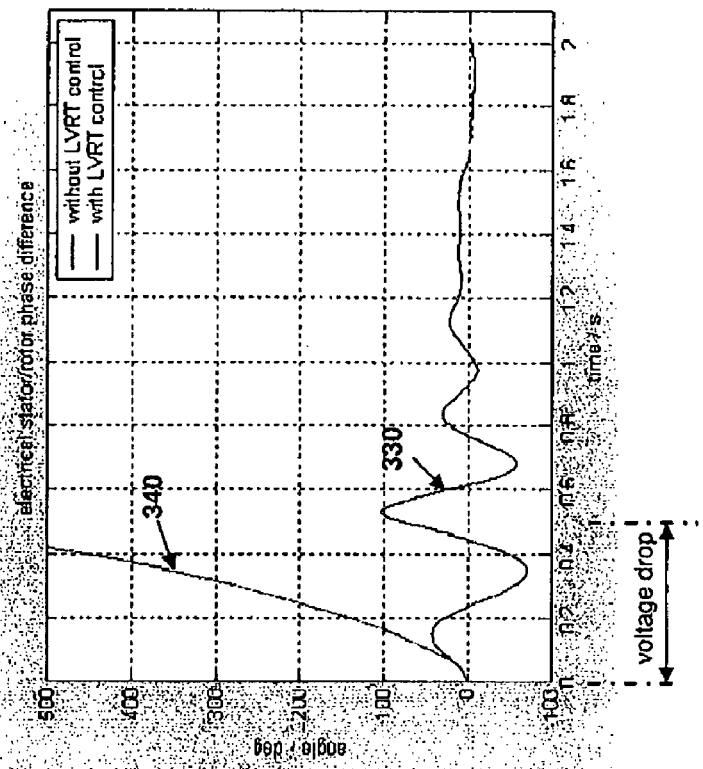
FIGS. 3A and 3B are simulation results illustrating the performance of a wind energy converter during a low voltage event.
Figure 3A:
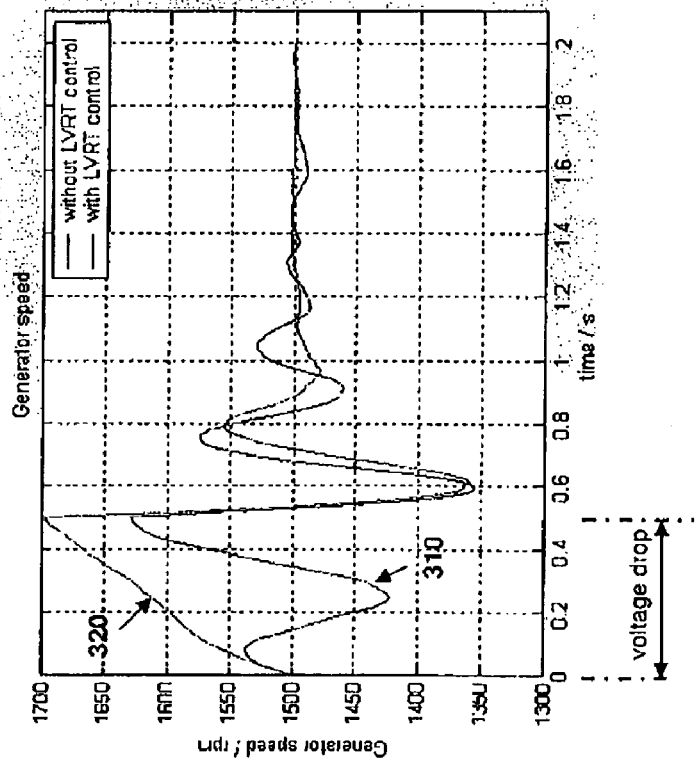

Referring to FIGS. 3A and 3B, simulation results (e.g., generated by MATLAB, a programming language created by The Mathworks, Natick, Mass.) show that using LVRT control improves generator performance during a low voltage event. In this simulation, at t=0, grid voltage quickly drops from a nominal level to zero and stays for a period of 0.5 s; starting from t=0.5 s, grid voltage recovers to the nominal level.

During this 0.5 s low voltage event, a generator without LVRT control accelerates from a prescribed speed 1500 rpm up to 1700 rpm (curve 320), and the phase difference between rotor field and stator field (curve 340) goes far beyond a critical angle of 150 degree—a condition under which the generator is no longer synchronous to the grid.

In comparison, a LVRT control system effectively regulates generator speed during the low voltage period (curve 310), and maintains the phase difference below the critical angle (curve 330). As the generator stays synchronous to the grid, power continues to be safely transmitted.

In some applications, a pressure relief valve 184 is placed between pressure lines 176 and 178 (see FIG. 1B) for gear protection. The pressure relief valve 184 limits the pressure in the hydraulic lines and thus protects the mechanical parts from overload and destruction, for example, by preventing the occurrence of exceedingly large torques within the gear. Other safety mechanisms may also be implemented in the drive train 100 to protect the gears.

It is to be understood that the foregoing description is intended to illustrate and not to limit the scope of the invention, which is defined by the scope of the appended claims. For example, in the implementation discussed above in conjunction with FIG. 1B, control system 190 included a pair of control units (control unit A 192 and control unit B 194). In other implementations, the pair of control units can be combined in an integral unit. Other embodiments are within the scope of the following claims.

What is claimed is:

1. A method for operating a wind energy converter configured for transmitting power to an electric grid, the wind energy converter comprising a variable ratio gear system mechanically coupled between a rotor and a generator of the wind energy converter, the variable ratio gear system including at least one shaft coupled to the generator and a hydraulic circuit having
   a hydraulic unit mechanically coupled to the shaft, the hydraulic circuit providing a hydraulic pressure, and
the method comprising:
   detecting a hydraulic pressure of the hydraulic circuit using a pressure sensor; and
   using the output signal from the pressure sensor to electronically control a rotational speed of the generator, including
      providing a desired hydraulic pressure signal indicative of a desired hydraulic pressure associated with a prescribed generator speed;
      receiving the actual hydraulic pressure signal indicative of an actual hydraulic pressure; and
      computing a pressure error signal between the desired and actual hydraulic pressure signals.

2. The method of claim 1, further comprising:
computing, on the basis of the pressure error signal, a first parameter of the desired configuration of the hydraulic unit.

3. The method of claim 2, further comprising:
receiving an offset signal; and
computing a second parameter of the desired configuration of the hydraulic unit on the basis of the offset signal and the first parameter.

4. The method of claim 3, wherein the desired configuration of the hydraulic unit is determined on the basis of the first and second parameters.

5. The method of claim 3, wherein the first and second parameters are responsive to a change in the rotational speed of the generator.

6. The method of claim 3, wherein the second parameter conforms with a predetermined limitation.

7. The method of claim 6, wherein the predetermined limitation includes a limitation on a rate of change in the second parameter.

* * * * *